United States Patent
Duffy et al.

(10) Patent No.: US 9,909,438 B2
(45) Date of Patent: Mar. 6, 2018

(54) HYDRODYNAMIC CARBON FACE SEAL PRESSURE BOOSTER

(71) Applicant: United Technologies Corporation, Farmington, CT (US)

(72) Inventors: Kevin Duffy, Hartford, CT (US); Ronald K. Kovacik, Manchester, CT (US); Brady Walker, Glastonbury, CT (US); Antonio F. Artiles, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/096,952

(22) Filed: Apr. 12, 2016

(65) Prior Publication Data

US 2017/0292394 A1    Oct. 12, 2017

(51) Int. Cl.
*F16J 15/16* (2006.01)
*F01D 11/00* (2006.01)
*F16J 15/40* (2006.01)

(52) U.S. Cl.
CPC ........... *F01D 11/003* (2013.01); *F16J 15/406* (2013.01); *F05D 2220/32* (2013.01); *F05D 2240/50* (2013.01)

(58) Field of Classification Search
CPC ...... F16J 15/34; F16J 15/3404; F16J 15/3412; F16J 15/3416; F16J 15/342; F01D 11/003; F01D 11/005; F05D 2240/55
See application file for complete search history.

(56) References Cited

U.S. PATENT DOCUMENTS

| | | | |
|---|---|---|---|
| 3,081,097 A | 3/1963 | Dison et al. | |
| 3,315,968 A * | 4/1967 | Hanlon | F16J 15/342 277/361 |
| 3,347,553 A | 10/1967 | Schweiger | |
| 4,523,764 A * | 6/1985 | Albers | F16J 15/342 277/400 |
| 4,928,978 A | 5/1990 | Shaffer et al. | |
| 5,174,584 A | 12/1992 | Lahrman | |
| 5,509,664 A | 4/1996 | Borkiewicz | |
| 5,516,118 A | 5/1996 | Jones | |
| 5,558,341 A * | 9/1996 | McNickle | F16J 15/3488 277/400 |
| 6,196,790 B1 | 3/2001 | Sheridan | |

(Continued)

OTHER PUBLICATIONS

Flowserve, "Turbomachinery Sealing Solutions, Seals, Systems, Services", available from: <https://www.flowserve.com/files/Files/Literature/ProductLiterature/Seals/FSD113eng_Turbomachinery.pdf>, 2015.

(Continued)

*Primary Examiner* — Gilbert Y Lee
(74) *Attorney, Agent, or Firm* — O'Shea Getz P.C.

(57) ABSTRACT

Aspects of the disclosure are directed to a system associated with an engine of an aircraft, the system comprising: a fluid source that is configured to provide a fluid at a first pressure value, a carbon seal, a seal plate that includes at least one lift-off feature that interfaces to the carbon seal, and a pressure boosting mechanism configured to obtain the fluid from the fluid source, increase the pressure of the fluid to a second pressure value, and provide the fluid at the second pressure value to the at least one lift-off feature.

13 Claims, 7 Drawing Sheets

(56) References Cited

U.S. PATENT DOCUMENTS

| | | | |
|---|---|---|---|
| 6,325,378 B1* | 12/2001 | Okumachi | F16J 15/342 |
| | | | 277/348 |
| 6,446,976 B1 | 9/2002 | Key | |
| 6,505,836 B1* | 1/2003 | Toshihiko | F16J 15/342 |
| | | | 277/400 |
| 6,579,078 B2 | 6/2003 | Hill | |
| 6,676,369 B2 | 1/2004 | Brauer | |
| 8,641,366 B1 | 2/2014 | Ullah et al. | |
| 9,151,390 B2* | 10/2015 | Hosoe | F16J 15/3412 |
| 9,482,158 B2* | 11/2016 | Ullah | F01D 11/04 |
| 2001/0052673 A1* | 12/2001 | Okumachi | F16J 15/342 |
| | | | 277/348 |
| 2002/0014743 A1* | 2/2002 | Zheng | F16J 15/342 |
| | | | 277/358 |
| 2007/0187903 A1 | 8/2007 | Berdichevsky | |
| 2009/0047123 A1 | 2/2009 | Glahn et al. | |
| 2009/0184475 A1 | 7/2009 | Dobek | |
| 2010/0244385 A1 | 9/2010 | Ullah | |
| 2011/0233871 A1 | 9/2011 | Davis | |
| 2014/0086741 A1* | 3/2014 | Ullah | F02C 7/28 |
| | | | 415/230 |
| 2014/0197600 A1* | 7/2014 | Hosoe | F16J 15/3412 |
| | | | 277/409 |
| 2014/0255156 A1 | 9/2014 | Ullah | |

OTHER PUBLICATIONS

Extended EP Search Report for EP Appln. No. 17166339.6 dated Aug. 11, 2017.

* cited by examiner

HYDRODYNAMIC CARBON FACE SEAL PRESSURE BOOSTER

BACKGROUND

Gas turbine engines, such as those which power aircraft and industrial equipment, employ a compressor to compress air that is drawn into the engine and a turbine to capture energy associated with the combustion of a fuel-air mixture. The compressor and turbine employ rotors that include multiple airfoil blades mounted on, or formed integrally with, rims of a plurality of disks mounted on a shaft. Typically, such shafts are rotatably supported on bearings and are lubricated with a lubricant. For example, oil may be disposed within an interior of a bearing compartment.

Referring to FIG. 2, it is known to provide a system 200 that includes a bearing compartment 204 with mechanical seals, such as non-contacting face seals, to reduce (e.g., minimize) the escape of lubricating fluid from forward and aft ends of the bearing compartment. The air outside of these ends is typically at a higher pressure than the pressure of an air-oil mixture inside the bearing compartment 204. Face seals typically employ a stationary carbon seal 210 and a rotatable seal plate 216 mounted on a rotor shaft 222. The carbon seal 210 is usually provided with a smooth, continuous (uninterrupted) sealing surface which is disposed in a face-to-face, opposed relationship to a sealing surface of the seal plate 216. A spacer 228 maintains the seal plate 216 in axial alignment. Like the seal plate 216, the shaft 222 and the spacer 228 are configured to rotate.

The sealing surface of the seal plate 216 is often equipped with hydrodynamic (so-called "lift-off") features 234, such as with a pattern of spiral grooves. A source 240 of fluid (e.g., air), which is taken from the compressor or a core primary/combustion flowpath, enters the grooves 234 at the entrainment location 246. The fluid then exits the grooves 234 and consumes at least a portion of a space between the carbon seal 210 and the seal plate 216 from outside the bearing compartment 204. The fluid is pumped within the spiral grooves 234, raising the pressure thereof such that the elevated pressure of the fluid within the grooves 234 forms a fluid barrier between the carbon seal 210 and the seal plate 216 thereby restricting the leakage of the air-oil mixture from inside the bearing compartment 204 into the space between the carbon seal 210 and the seal plate 216. The pumping characteristics of the grooves 234 to provide the elevated pressure fluid seal between the carbon seal 210 and the seal plate 216 is a function of the geometry of the grooves 234, the rotational speed of the seal plate 216 and the characteristics of the fluid supplied to the grooves 234 at the entrainment location 246.

Since gas turbine engines operate at a wide range of rotational speeds, the ability of the grooves 234 to provide the pressurization of sealing fluid between the carbon seal 210 and the seal plate 216 over a wide range of rotational shaft 222 speeds is imperative. However, when the pressure of the source fluid 240 is relatively low (such as for example at high altitude, sub-ambient pressure conditions) the low density of the fluid 240 compromises the ability of the grooves 234 to generate sufficient pressure.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system associated with an engine (e.g., of an aircraft or otherwise), the system comprising: a fluid source that is configured to provide a fluid at a first pressure value, a carbon seal, a seal plate that includes at least one lift-off feature that interfaces to the carbon seal, and a pressure boosting mechanism configured to obtain the fluid from the fluid source, increase the pressure of the fluid to a second pressure value, and provide the fluid at the second pressure value to the at least one lift-off feature. In some embodiments, the fluid source includes a compressor of the engine. In some embodiments, the at least one lift-off feature includes a plurality of grooves formed in a seal plate face of the seal plate. In some embodiments, at least one of the grooves is formed as a recess in the seal plate face. In some embodiments, the recess is approximately 0.001 inches deep. In some embodiments, the system further comprises: a shaft of the engine, and a spacer coupled to the shaft and located radially outward of the shaft. In some embodiments, the pressure boosting mechanism includes a gap defined between a first surface of the seal plate and a second surface of the spacer. In some embodiments, the pressure boosting mechanism includes a cavity formed in the seal plate coupled to the gap. In some embodiments, the fluid at the second pressure value in the cavity is provided to the at least one lift-off feature via at least one hole formed in the seal plate. In some embodiments, a ratio of an axial length of the gap to a radial width of the gap has a value within the range of 2.50 and 3.33. In some embodiments, the pressure boosting mechanism includes at least one hole formed through the spacer. In some embodiments, the pressure boosting mechanism includes a cavity formed in the seal plate coupled to the at least one hole formed through the spacer. In some embodiments, the fluid at the second pressure value in the cavity is provided to the at least one lift-off feature via at least one hole formed in the seal plate. In some embodiments, the pressure boosting mechanism includes an o-ring seal configured to prevent a backflow of the fluid at the second pressure value to the fluid source. In some embodiments, the pressure boosting mechanism includes at least one hole formed in the seal plate. In some embodiments, the at least one hole is angled relative to a radial reference direction and has a value within a range of 0 to 90 degrees.

Aspects of the disclosure are directed to a system comprising: a fluid source that is configured to provide a fluid, a carbon seal, a seal plate having a seal plate face that interfaces to the carbon seal, and a plurality of grooves formed in the seal plate face, where the seal plate at least partially defines a cavity coupled to the fluid source, where the seal plate at least partially defines a plurality of holes that are coupled to the cavity and the plurality of grooves. In some embodiments, the system further comprises: a spacer, where the spacer and the seal plate define a gap that couples the fluid source and the cavity. In some embodiments, the system further comprises: a spacer, where the spacer defines a second plurality of holes that couple the fluid source and the cavity.

Aspects of the disclosure are directed to a system comprising: a fluid source that is configured to provide a fluid, a carbon seal, a seal plate having a seal plate face that interfaces to the carbon seal, and a plurality of grooves formed in the seal plate face, where the seal plate defines a plurality of holes that couple the fluid source and the plurality of grooves, where the holes are angled relative to a radial reference direction and each hole has a value within a range of 0 to 90 degrees.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
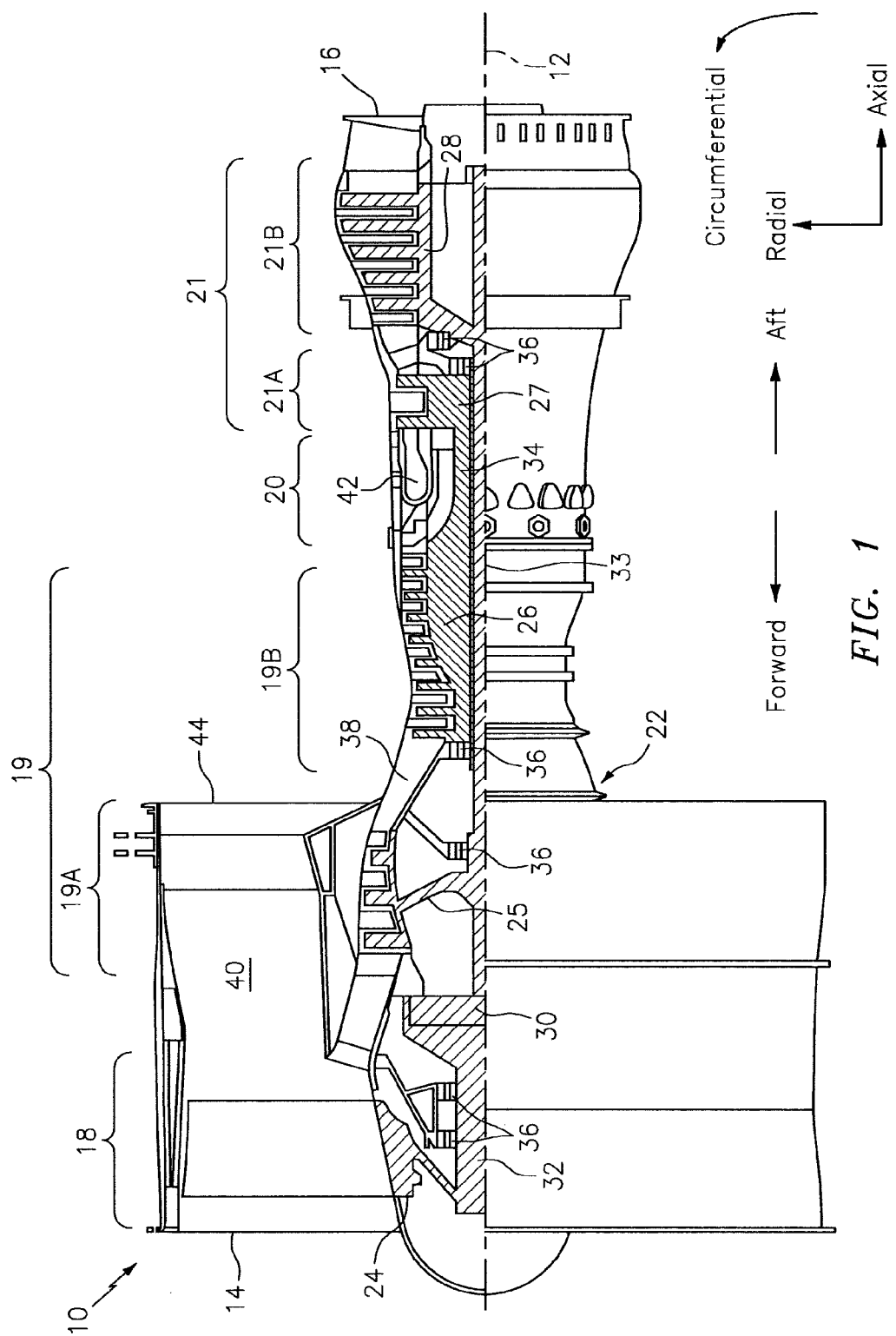
FIG. 1 is a side cutaway illustration of a geared turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for increasing (e.g., maximizing) a pressure of a sealing/buffer fluid as the fluid is taken into the interior of a sealing member (e.g., a rotating sealing member). The fluid at the elevated pressure may be provided to one or more hydrodynamic features, such as for example one or more spiral grooves. The increase in pressure of the fluid may be obtained by rotating the fluid as it is delivered through holes at a circumferentially inclined angle.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for a geared turbine engine 10. Aspects of the disclosure may be applied in connection with other environments, including additional configurations for engines. Aspects of the disclosure may be applied in the context of a non-geared engine.

Figure 2:
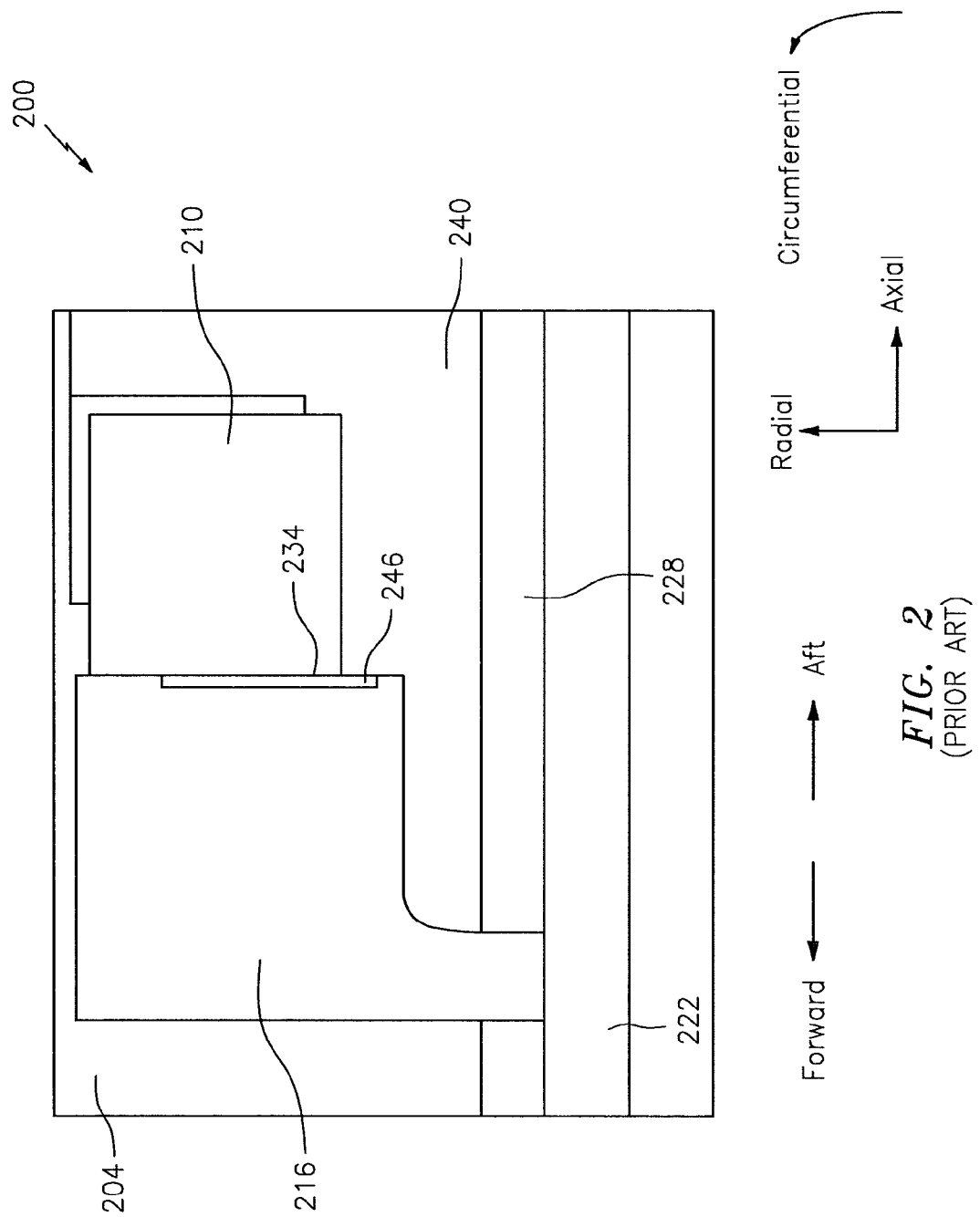
FIG. 2 illustrates a system incorporating a prior art hydrodynamic face seal.
Figure 3:
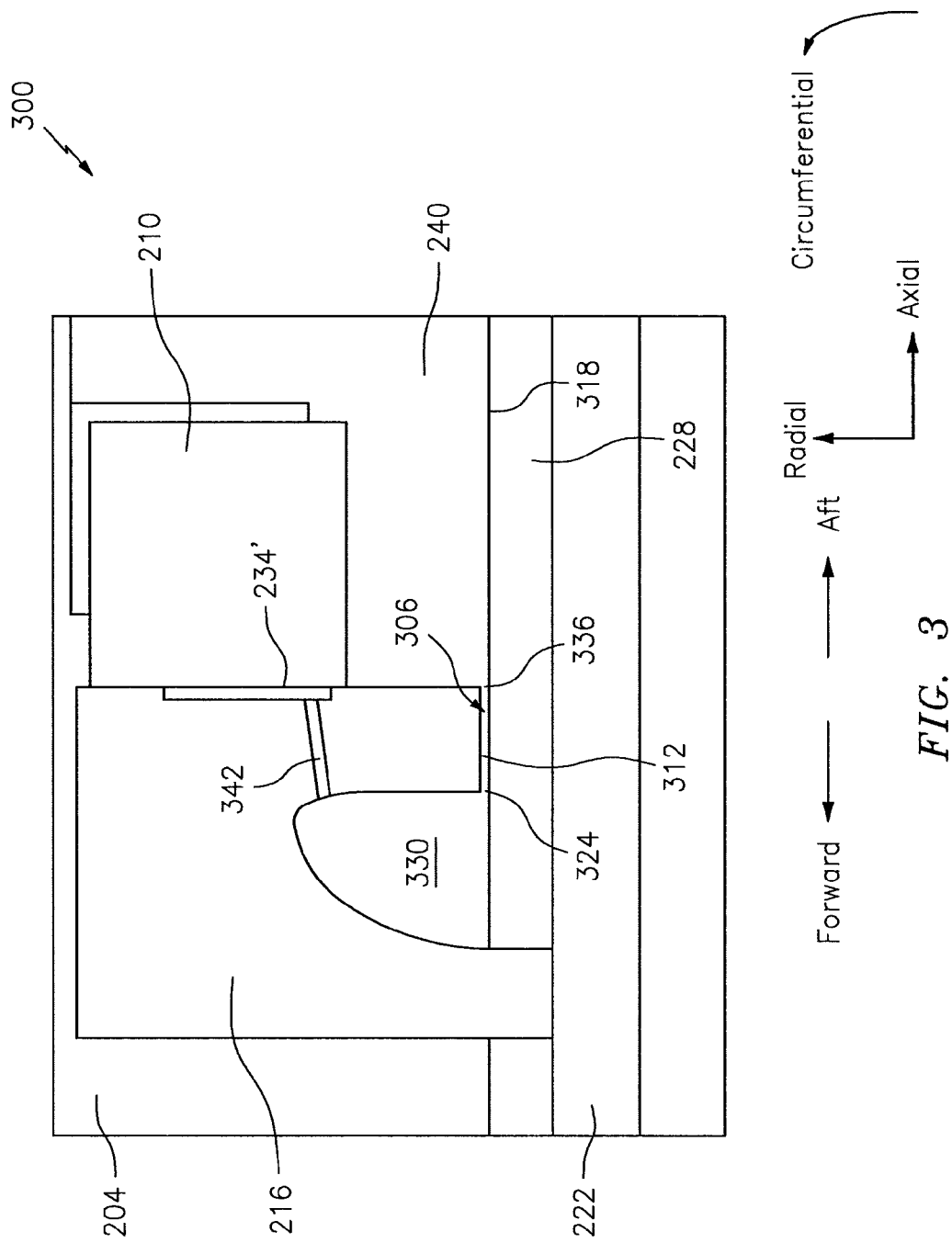
FIGS. 3-5 illustrate systems incorporating seals with various fluid pressure boosting mechanisms in accordance with aspects of this disclosure.

Referring now to FIG. 3, a system 300 is shown. The system 300 is shown as including some of the features of the system 200 of FIG. 2 described above. As such, a complete re-description of the common features is omitted for the sake of brevity.

The system 300 is shown as having a clearance/gap 306 formed between a surface (e.g., a radially inner surface) 312 of the seal plate 216 and a surface (e.g., a radially outer surface) 318 of the spacer 228. The fluid 240 may traverse the axial length of the gap 306 (illustratively in an aft-to-forward direction as shown in FIG. 3), such that when the fluid 240 reaches an end 324 of the gap 306 proximate a seal cavity 330 (formed in the seal plate 216) the fluid 240 may have a rotational component imparted upon it by wall shear forces at the inner and outer diameter of the gap 306. This rotation of the fluid may persist within the seal cavity 330. The rotation of the fluid imparted by the gap 306 and the seal cavity 330 may cause the pressure of the fluid in the seal cavity 330 to be greater than the pressure of the fluid at the start 336 of the gap 306. The pressurized fluid within the seal cavity 330 may be delivered to grooves 234' via one or more holes 342 formed in the seal plate 216.

In some embodiments, the gap 306 may have an axial length within a range of about 0.050 inches and about 0.100 inches (1.27 millimeters and 2.54 millimeters). The gap 306 may have a radial width within a range of about 0.020 inches and about 0.030 inches (0.51 millimeters and 0.76 millimeters). Using the exemplary values described above, the ratio of the axial length to radial width may range from 0.05/0.02=2.50 to 0.100/0.030=3.33.

Figure 4:
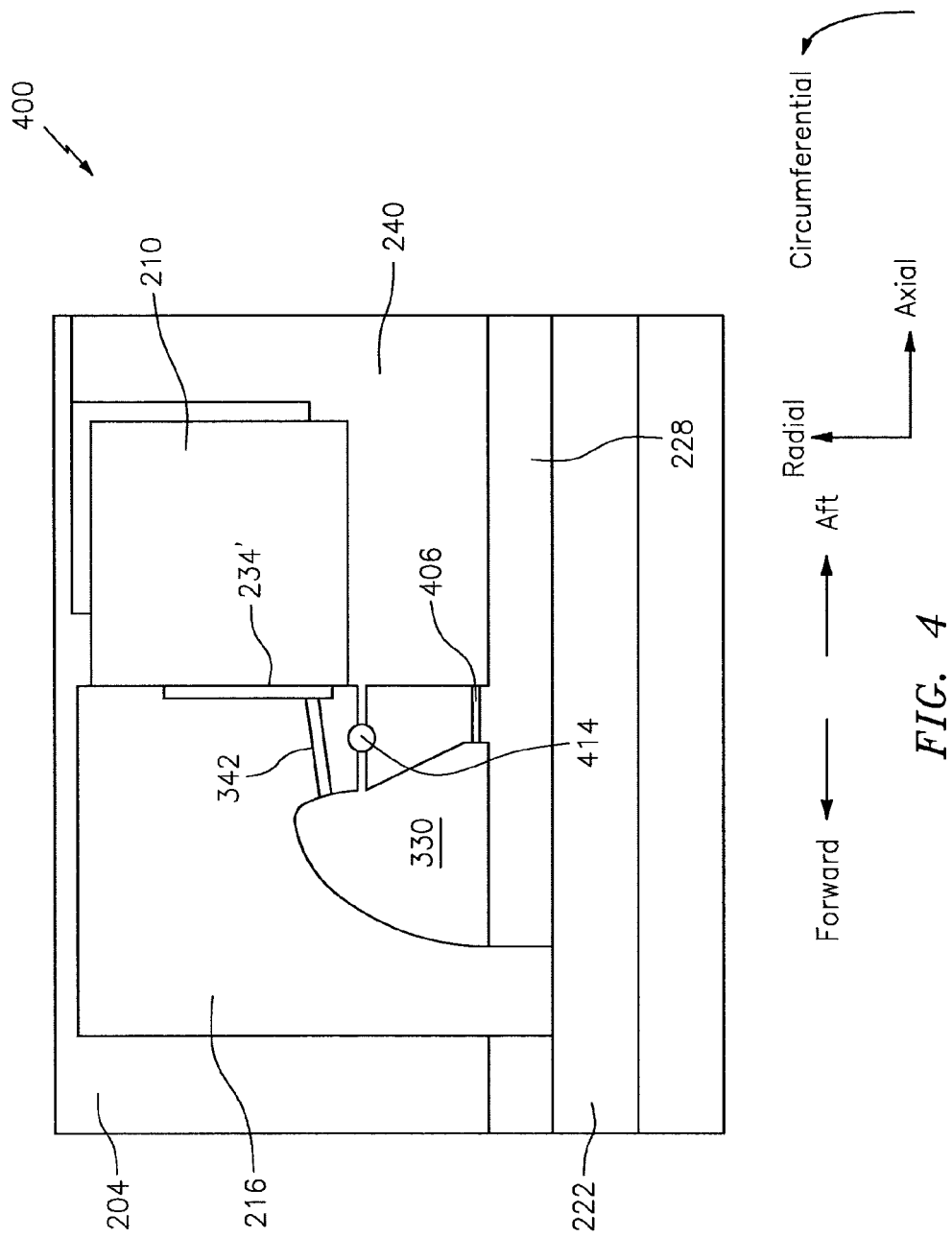

Referring to FIG. 4, a system 400 is shown. In the system 400, one or more holes 406 may be formed in/through the spacer 228. The fluid 240 may traverse the holes 406 (illustratively aft-to-forward in FIG. 4) before reaching the seal cavity 330. Much like the system 300, the pressure of the fluid may increase as a result of the rotation in the seal cavity 330 in the system 400. The pressurized fluid may be delivered by the holes 342 to the grooves 234' in the system 400 in a substantially similar manner as described above in connection with the system 300.

The system 400 may include an o-ring seal 414. The o-ring seal 414 may be used to prevent or minimize a spill-back/backflow of the pressurized fluid in the seal cavity 330 towards the fluid source 240. In other words, the o-ring seal 414 may encourage the pressurized fluid in the seal cavity 330 to flow to the grooves 234' via the holes 342. The o-ring seal 414 is one example of a sealing member (e.g., a static sealing member); other types of sealing members may be used.

Figure 5:
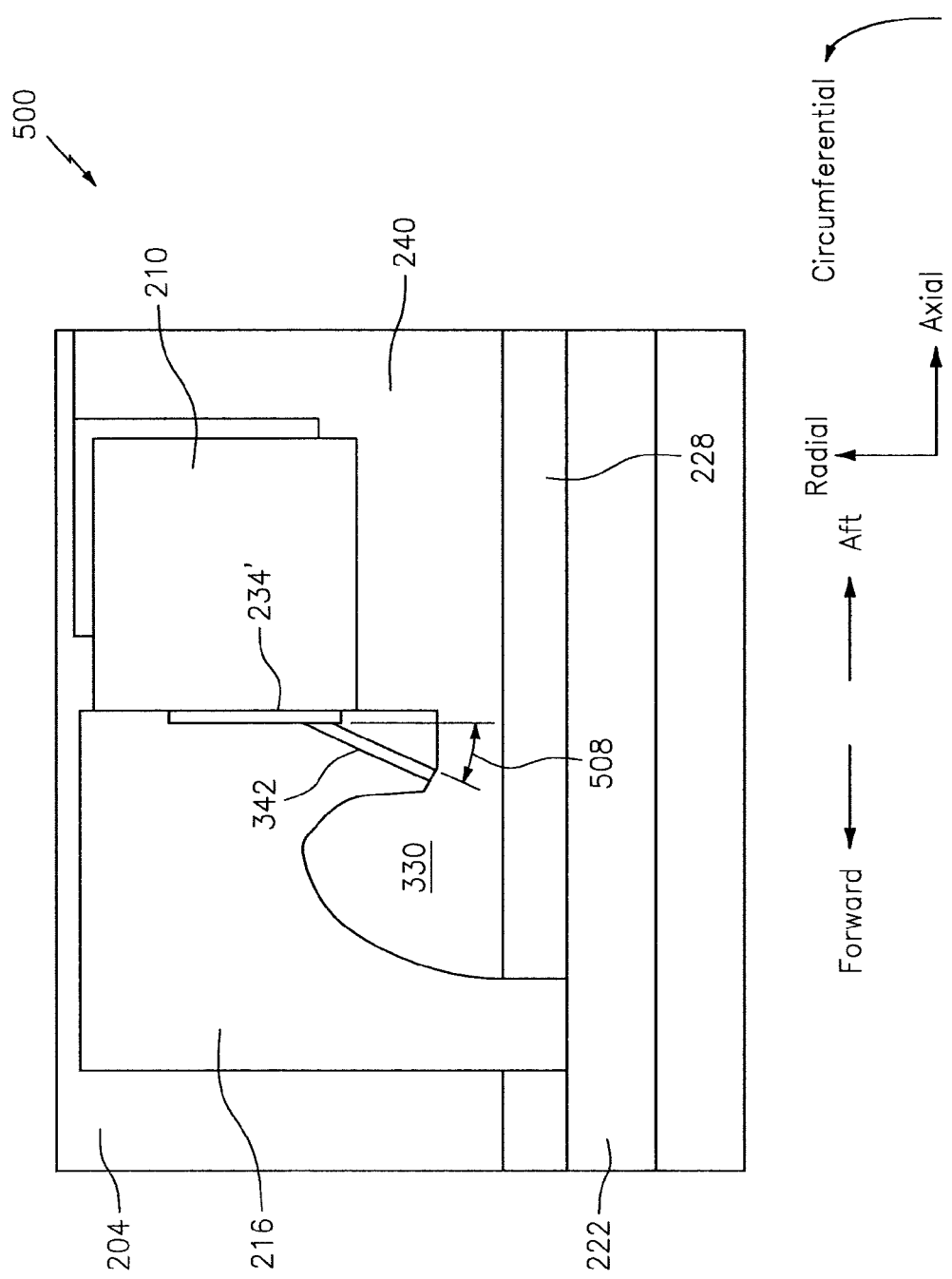

Referring now to FIG. 5, a system 500 is shown. In the system 500, the holes 342 convey the pressurized fluid to the grooves 234'. The holes 342 are shown in FIG. 5 as being oriented at an angle 508 relative to the radial reference direction. The angle 508 may assume a value within one or more ranges, such as for example a value within a range of 0 to 90 degrees. One skilled in the art would appreciate that the particular value, or range of values, that is used for the angle 508 may be based in part on one or more dimensions of the holes 342 relative to one or more dimensions of the grooves 234'.

The holes 342 shown in systems 300, 400 and 500 as well as the holes 406 in system 400, although shown in the cross-sectional views in FIGS. 3-5 as being confined within the same circumferential plane each, may be inclined in the circumferential direction in order to enhance the pressure build-up effect by the action of rotation. This enhanced hydrodynamic pressurization is analogous to the spiral grooves shown in FIGS. 6A and 6B, which build up the pressure due to the combined effect of their circumferential inclination and rotation.

At least some of features shown in the systems 300, 400, and 500 may be fully circumferential. For example, in some embodiments all of the features may be fully circumferential with the exception of the holes 342 and the grooves 234'.

Figure 6A:
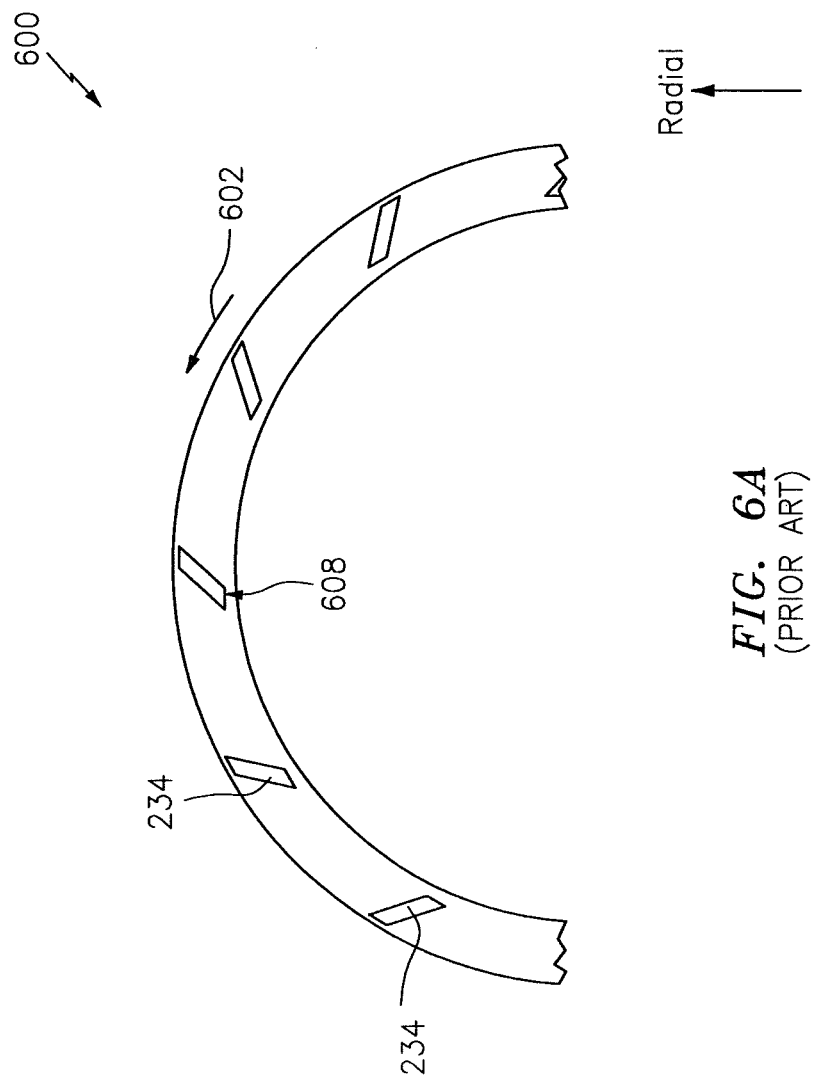
FIG. 6A illustrates a prior art seal plate face incorporating lift-off features.

Referring now to FIG. 6A, a closer view of the grooves 234 associated with FIG. 2 is shown. In particular, the grooves 234 are shown in relation to a seal plate face 600 of the seal plate 216. Also superimposed in FIG. 6A is a rotational reference direction 602. The fluid that enters the grooves 234 is entrained at the radially innermost location 608 of the grooves 234. In FIGS. 2 and 6A, the fluid that enters the grooves 234 may be at approximately the same pressure as the source/buffer fluid 240.

Figure 6B:
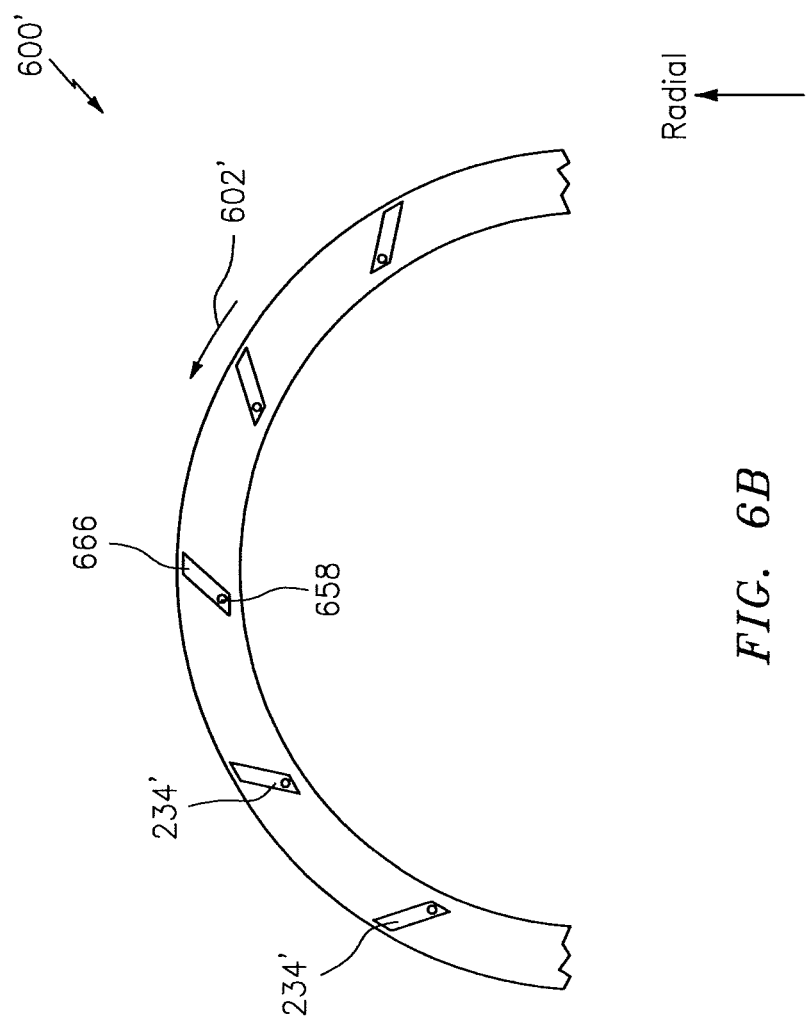
FIG. 6B illustrates a seal plate face incorporating lift-off features in accordance with aspects of this disclosure.

In contrast to FIG. 6A, FIG. 6B provides a closer view of the grooves 234' associated with FIGS. 3-5. In particular, the grooves 234' are shown in relation to a seal plate face 600' of the seal plate 216. Also superimposed in FIG. 6B is a rotational reference direction 602', which may correspond to the rotational reference direction 602. The fluid that enters the grooves 234' may enter through holes 342 formed (e.g., drilled, electrical discharge machined, etc.) in the seal plate 216 (see FIGS. 3-5); the dots 658 may represent the interface from the holes 342 to the grooves 234'. The grooves 234' may be configured as recesses in the seal plate face 600'; the recesses may be approximately 0.001 inches (approximately 25.4 micrometers) deep.

The pressurized fluid that enters the grooves 234' at the dots 658 may be distributed throughout the length/span of the grooves 234'. At least a portion of the fluid within each of the grooves 234' may escape the groove '234 proximate an outer diameter (OD) 666 of the groove 234'. This escaped fluid may create the lift-off in relation to the carbon seal 210 and the seal plate 216.

Technical effects and benefits of this disclosure include a seal that may be incorporated as part of one or more sections of an engine, such as for example as part of a bearing compartment. Relative to a conventional seal, a seal in accordance with this disclosure may have an extended usable lifetime due to the avoidance or minimization of wear. For example, an increase in the pressure of the fluid delivered to lift-off features (e.g., grooves) of a seal may increase the hydrodynamic lift for a given shaft speed. This increase in lift may result in less wear of the carbon seal portion of the seal, particularly at low shaft speeds. Still further, a reduction in seal leakage may be obtained due to an increase in differential pressure across the carbon seal and the seal plate.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A seal for a component of a gas turbine engine, the seal comprising:
    a rotating seal disposed against a first axial side of the component;
    a stationary seal disposed against a first axial side of the rotating seal;
    a groove in a surface between the rotating seal and the stationary seal; and
    a spacer;
    wherein a cavity is disposed in the rotating seal, the cavity opening to a radially interior side of the rotating seal;
    wherein a channel is disposed in the rotating seal, fluidly connecting the cavity and the groove;
    wherein a radially inner surface of the rotating seal and a radially outer surface of the spacer define a gap; and
    wherein the gap has an axial length within a range of 0.05 inches and 0.10 inches and a radial width within a range of 0.02 inches and 0.03 inches to cause a rotational component to be imparted on a fluid that traverses the axial length of the gap at an end of the gap proximate the cavity.

2. The seal of claim 1, wherein the component is a bearing compartment.

3. The seal of claim 1, wherein the stationary seal is a carbon seal.

4. The seal of claim 1, wherein the groove is in the rotating seal.

5. The seal of claim 1, wherein the groove is a spiral groove.

6. The seal of claim 1, wherein the groove is a plurality of grooves.

7. The seal of claim 1, wherein a radially outer end of the groove is circumferentially offset from a radially inner end of the groove.

8. A gas turbine engine comprising:
    a component;
    a seal for the component, the seal including
        a rotating seal disposed against a first axial side of the component;

a stationary seal disposed against a first axial side of the rotating seal; and a groove in a surface between the rotating seal and the stationary seal;

a shaft; and a spacer coupled to the shaft and located radially outward of the shaft;

wherein a cavity is disposed in the rotating seal, the cavity opening to a radially interior side of the rotating seal;

wherein a channel is disposed in the rotating seal, fluidly connecting the cavity and the groove;

wherein a radially inner surface of the rotating seal and a radially outer surface of the spacer define a gap; and wherein the gap has an axial length within a range of 0.05 inches and 0.10 inches and a radial width within a range of 0.02 inches and 0.03 inches to cause a rotational component to be imparted on a fluid that traverses the axial length of the gap at an end of the gap proximate the cavity.

9. The gas turbine engine of claim 8, further comprising:
a compressor that provides at least a portion of the fluid.

10. The gas turbine engine of claim 8, further comprising:
an o-ring seal that prevents fluid in the cavity from flowing to a fluid source.

11. The gas turbine engine of claim 8, wherein the component is a bearing compartment.

12. The gas turbine engine of claim 8, wherein the stationary seal includes a carbon seal.

13. The gas turbine engine of claim 8, wherein the channel is angled relative to a radial reference direction associated with the engine and has a value within a range of 0 to 90 degrees.

* * * * *